US006779896B2

(12) United States Patent
Luerkens et al.

(10) Patent No.: US 6,779,896 B2
(45) Date of Patent: Aug. 24, 2004

(54) ELECTRONIC CIRCUIT FOR OPERATING A HID LAMP, AND IMAGE PROJECTOR

(75) Inventors: Peter Luerkens, Aachen (DE); Carsten Deppe, Aachen (DE); Holger Moench, Vaals (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/201,679

(22) Filed: Jul. 23, 2002

(65) Prior Publication Data

US 2003/0020412 A1 Jan. 30, 2003

(30) Foreign Application Priority Data

Jul. 27, 2001 (DE) ........................................ 101 36 474

(51) Int. Cl.[7] .......................... G03B 21/14; H05B 37/02

(52) U.S. Cl. ............................ 353/84; 353/85; 353/87; 353/82; 315/149; 315/150

(58) Field of Search ......................... 315/149, 150–159, 315/291, 307; 353/85, 84, 82, 87, 50, 66, 37, 73, 48

(56) References Cited

U.S. PATENT DOCUMENTS 4,115,006 A * 9/1978 Reymond et al. ........ 356/139.1
4,616,135 A * 10/1986 Hosoi et al. ................ 250/585
5,399,867 A * 3/1995 Kohno .................... 250/461.1
5,534,948 A * 7/1996 Baldwin ..................... 348/675
6,323,491 B1 * 11/2001 Forsyth ...................... 250/372
6,522,086 B2 * 2/2003 Gemunder et al. ......... 315/291
6,561,652 B1 * 5/2003 Kwok et al. .................. 353/31
2002/0063789 A1 * 5/2002 Acharya et al. ............ 348/273

* cited by examiner

*Primary Examiner*—Tuyet T. Vo

(57) ABSTRACT

An electronic circuit for operating a High Intensity Discharge (HID) lamp, in particular a Ultra High Pressure (UHP) lamp, such as those preferably used in image projectors. The circuit comprises a lamp ballast for offering a controlled lamp current for operating the HID lamp and a brightness sensor for generating and providing a sensor signal which represents the brightness of the light applied by the lamp to the image generator. The lamp ballast controls the lamp current such that the brightness of the light of the lamp remains constant. Brightness control is made possible throughout the entire operational life of the lamp, and the use of sensors of simple construction is made possible by an incorporation within the electric circuit of a filter that high-pass filters the sensor signal before it is supplied as a control signal to the lamp ballast.

20 Claims, 2 Drawing Sheets

ELECTRONIC CIRCUIT FOR OPERATING A HID LAMP, AND IMAGE PROJECTOR

The invention relates to an electronic circuit for operating a High Intensity Discharge (HID) lamp, in particular an Ultra High Pressure (UHP) lamp.

The invention further relates to an image projector with the electronic circuit for operating a High Intensity Discharge (HID) lamp, in particular an Ultra High Pressure (UHP) lamp.

HID and UHP lamps are known in principle from the prior art. They are preferably used for projection purposes, but also, for example, for operating automobile headlights. Their features are a very small light arc accompanied by a high luminous efficacy, which leads to a very good overall efficiency. The brightness of these lamps is approximately two to four times that of other gas discharge lamps.

A disadvantage of these HID lamps, however, is the effect of arc shift, i.e., a change in the position of the light arc during the operation of these lamps. The proportion of the total amount of light generated by the lamp entering the image-generating system is changed by the change in arc position, so that the brightness of the projected image fluctuates. This effect also leads to undesirable fluctuations in the brightness distribution on the image generator. A flicker effect observable to the viewer is the result.

Various measures are known from the prior art for reducing this flicker effect.

A first measure is to provide an additional high current pulse in the waveform of the lamp current before the commutation thereof. This special shape of the lamp current is capable of suppressing the arc shift and thus the flicker effect successfully.

The provision of the high current pulse, however, has the disadvantage that the lamp ballast becomes larger and more expensive than for a lamp current of different shape, and also that the operational life of the HID lamp is clearly reduced.

A second measure which also may be suitable for reducing the flicker effect is disclosed in JP-2000028988A and is shown in FIG. 3. The JP document does primarily describe the solution to another problem, i.e., a gradual change in the lamp brightness over its total life, but it also discloses, though not explicitly, those criteria which must be fulfilled for a suppression of the flicker effect. Those skilled in the art will indeed derive suitable measures for reducing the flicker effect from the JP document at least indirectly. Referring to FIG. 3, JP-200028988A discloses an LCD projector with an optical system 420 and an electric circuit. The optical system 420 comprises a gas discharge lamp 422 with a reflector 421 and an integrator 423 connected downstream of the lamp, an image generator 424, and an objective 425*b*. The integrator 423 together with a condenser 425*a* safeguards a homogeneous brightness distribution in the illumination of the image generator 424, and thus in the image generated by the image generator 424. The electric circuit serves to operate the lamp 422. To this end, the electric circuit employs a lamp ballast 410 for offering a controlled lamp current to the lamp 422 in response to a control signal, and a brightness sensor 430 for generating and issuing a sensor signal. The sensor signal here represents the quantity of light given off by the lamp 422 at the location of the brightness sensor 430. The quantity of light represented by the sensor signal is compared with a given reference quantity of light in a microprocessor 440 so as to generate the control signal in dependence on the measured light quantity deviation and to provide it to the lamp ballast 410. The generated quantity of light is thus controlled to the reference value. A flicker effect may be prevented if the light quantity control takes place quickly enough.

The quantity of light given off by gas discharge lamps at a constant power decreases in the course of lamp life owing to various causes. To have a possibility of safeguarding nevertheless a constant brightness over the entire lamp life, it is suggested in the cited Japanese publication JP-2000028988A to operate the lamp at a power substantially below its rated power at the start of lamp life and to increase the operational power as lamp life progresses so as to obtain a constant brightness of the light generated by the lamp. This, however, is only possible until the moment the rated power is reached.

This second measure, however, has a drawback. Specifically, since the lamp is initially operated at a power below the rated power, the generated brightness is substantially lower than in the case of rated power, i.e., such a projector system requires a bigger lamp for generating the same brightness right from the start than does a system without this kind of control.

HID lamps, moreover, are characterized by a sensitive thermal balance which can be maintained satisfactorily at rated power only. Adverse effects in lamp life are to be expected in the case of deviations, so that the control in the manner of JP-2000028988A leads us to expect a shortened lamp life.

Furthermore, a positive and negative control of the brightness is possible at the start only. This possibility becomes smaller as the operating power rises and finally disappears entirely when the lamp is operated at its rated power. It should finally be noted that sensor defects in the disclosed circuit, for example an erroneous internal sensor gain factor, will immediately lead to an erroneous control signal and thus to an undesirable control behavior. The disclosed circuit thus as a rule requires particularly expensive and complicated sensors so as to avoid sensor errors.

In a particular, the brightness sensor in the known circuit should operate reliably not only at room temperature, but also at high temperatures prevailing inside an image projector.

Given this prior art, it is an object of the present invention to develop an electronic circuit for operating a HID lamp and an image projector with such an electronic circuit further such that a control of the brightness is rendered possible throughout lamp life and sensors of simpler construction, and thus less expensive sensors can be used.

This object is achieved by an electric circuit employing a high-pass filter for offering the control signal through high-pass filtering of the sensor signal.

Very low-frequency components of the brightness fluctuations, and in particular the DC component thereof, are filtered out from the sensor signal by the high-pass filter. These frequency components will thus be absent also in the control signal and will not be involved in the control of the HID lamp.

The remaining AC components of the brightness fluctuations are controlled down to zero, according to the invention, instead of controlling the absolute brightness to a given reference value, as in the prior art.

This has the advantage on the one hand that influences of erroneous offsets or erroneous sensitivities of the brightness sensor are filtered out from the sensor signal and thus exert no undesirable influence on the control. It is accordingly very well possible to use simple, inexpensive sensors for realizing the circuit according to the invention without the quality of the control being impaired thereby.

On the other hand, the high-pass filter advantageously allows an elimination by the control circuit of the brightness fluctuations throughout the entire life of the HID lamp. The elimination by the control circuit according to the invention is possible both in a positive direction and in a negative direction also during operation at rated power.

The flicker effect is effectively suppressed for the human eye in the control of the lamp according to the invention.

In an advantageous embodiment, a control unit within the lamp ballast is furthermore designed for controlling the electric power generated at the output of the control unit such that the HID lamp is operated constantly at its rated power level for a long period. As a result, the lamp life is maximized, while on the other hand it is safeguarded that the light output of the lamp is a maximum throughout its entire life.

The object of the invention is furthermore achieved an image projector incorporating the advantages mentioned above with reference to the electronic circuit. The human eye is particularly sensitive to flicker effects in the representation of still images with large, monochrome surfaces. The suppression of this effect is accordingly particularly advantageous here.

The description is accompanied by three Figures, of which

A preferred embodiment of the invention will now be described in detail with reference to FIGS. 1 to 3.

Figure 1:
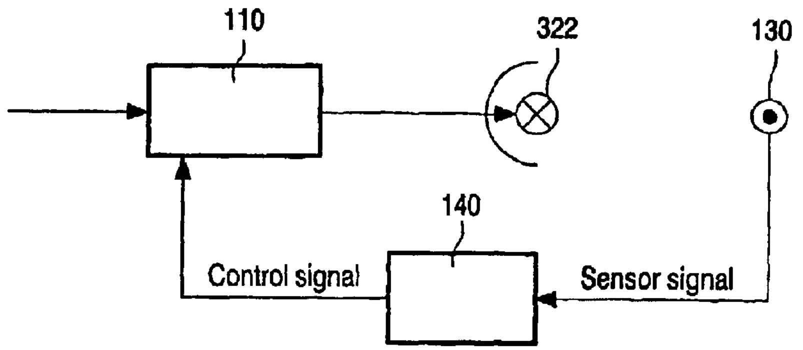
FIG. 1 shows an electronic circuit according to the invention.

FIG. 1 shows an electronic circuit for operating a HID lamp, in particular a UHP lamp, according to the invention. It comprises a lamp ballast 110, a brightness sensor 130, and a filter 140.

The lamp ballast 110 is constructed as a control unit and serves to provide and control a lamp current for operating the HID lamp 322 in response to a control signal, so that the quantity of light given off by the HID lamp at the location of the brightness sensor 130 is constant in the medium term.

The sensor signal generated by the brightness sensor 130 of FIG. 1 represents the quantity of light given off by the HID lamp in the location of the brightness sensor 130. The sensor signal is converted into the control signal through filtering in a filter 140. The filter 140 is preferably constructed as a high-pass filter, so that in particular the DC component is filtered out from the sensor signal and accordingly from the control signal.

This has the advantage, as described above in the general part of the description, that certain measurement errors of the brightness sensor 130 have no adverse effect on the result of the control.

The high-pass filtered control signal according to the invention represents only the AC component in the original sensor signal, i.e., only the brightness fluctuations proper. The brightness fluctuations may be caused, for example, by the arc shift described above, or by a transition of the lamp from a diffuse arc condition to a concentrated arc condition (or spot mode). The primary object of the control by the lamp ballast 110 is to generate a stabilized brightness without fast fluctuations, in particular in the location of the brightness sensor 130. This is achieved in that the lamp ballast 110 is constructed as a control unit is active in keeping the control signal at zero level or controlling it down to zero.

The lamp ballast 110 is capable at all times, according to the invention, of carrying out a positive or negative correction or control of the brightness, if this should be necessary, so as to keep the brightness substantially constant.

Instead of as a high-pass filter, the filter 140 may alternatively be constructed as a bandpass filter, i.e. a combined high- and low-pass filter. It will then preferably have a lower cut-off frequency of less than 1 Hz and an upper cut-off frequency of more than 100 Hz, depending on the lamp type and projection system. The upper cut-off frequency advantageously lies above the brightness fluctuation frequency that is still perceivable to the human eye. In contrast to the high-pass filter, the bandpass filter not only cuts off the DC component, but advantageously also cuts off the upper frequency range. This simplifies the requirements imposed on the construction of the lamp ballast 110 to the extent that the stability can be achieved in a much simpler manner, for a given accompanying high quality, than in the case of a control signal which is merely high-pass filtered.

The transfer ratio of the filter 110 may be furthermore designed such that the filter renders possible an additional amplification of the sensor signal for generating the control signal in addition to the low- or high-pass filtering.

Usually, the lamp ballast 110 is also constructed for controlling the electric power at its output—and thus also the electric power consumed by the lamp—constantly to the rated power level for a long period. This is usually done through monitoring of the product of lamp current and lamp voltage at the output of the lamp ballast 110. The power control is superimposed on the lamp current control described above for keeping the average lamp power constant.

There is an interaction between the two controls, for example in the following manner: to counteract a drop in brightness of the HID lamp 322 instantaneously registered by the brightness sensor 130, the lamp ballast 110 first provides an increase in the lamp current as part of the brightness control such that the brightness remains initially constant. This increase in the lamp current leads to an increase in the electric power provided at the output of the lamp ballast 110 for the lamp 322 and is recognized by the power control. The power supplied to the HID lamp 322 is indeed allowed to exceed its rated value for a short period, but not for a longer period. If the increased lamp current is not reduced again by the brightness control within a given period, for example because the lamp again provides a brighter light owing to a changed arc position, the power control will intervenes and reduce the lamp current, although the lamp will then provide a reduced brightness. It is ensured in this manner by the superimposed power control that the lamp will not be operated above its rated power for a longer period. The reduction in lamp current caused by the power control and the resulting reduction in the brightness of the lamp light is advantageously not perceived by the human eye because it takes place particularly slowly. The insensitivity of the human eye to slow brightness changes is utilized here.

In addition, the high-pass characteristic causes the control signal of the flicker control to disappear as well after some time, so that the lamp power returns to its initial value again, also if the power control is not activated.

It is safeguarded by the circuit according to the invention that the lamp is always operated at its rated power level throughout its lamp life on average. This has the advantage that the useful life of the lamp is a maximum and that the luminous efficacy of the lamp is an optimum right from the start of its operation.

Figure 2:
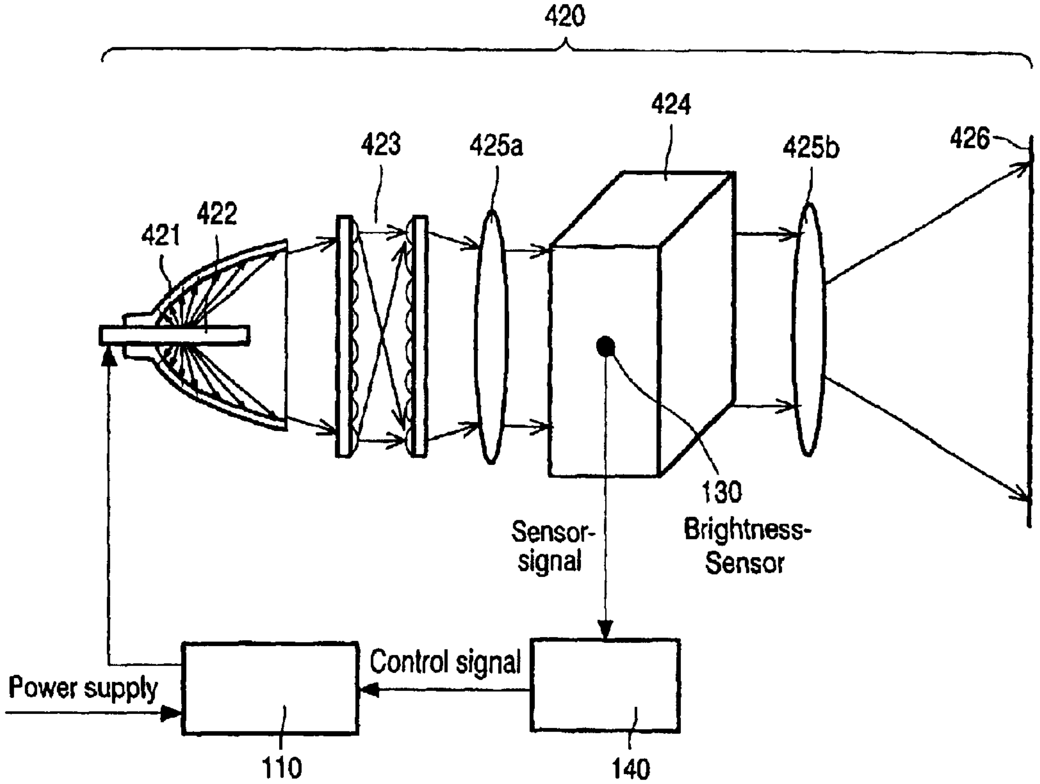
FIG. 2 shows an image projector with an optical system and an electronic circuit according to the invention.
Figure 3:
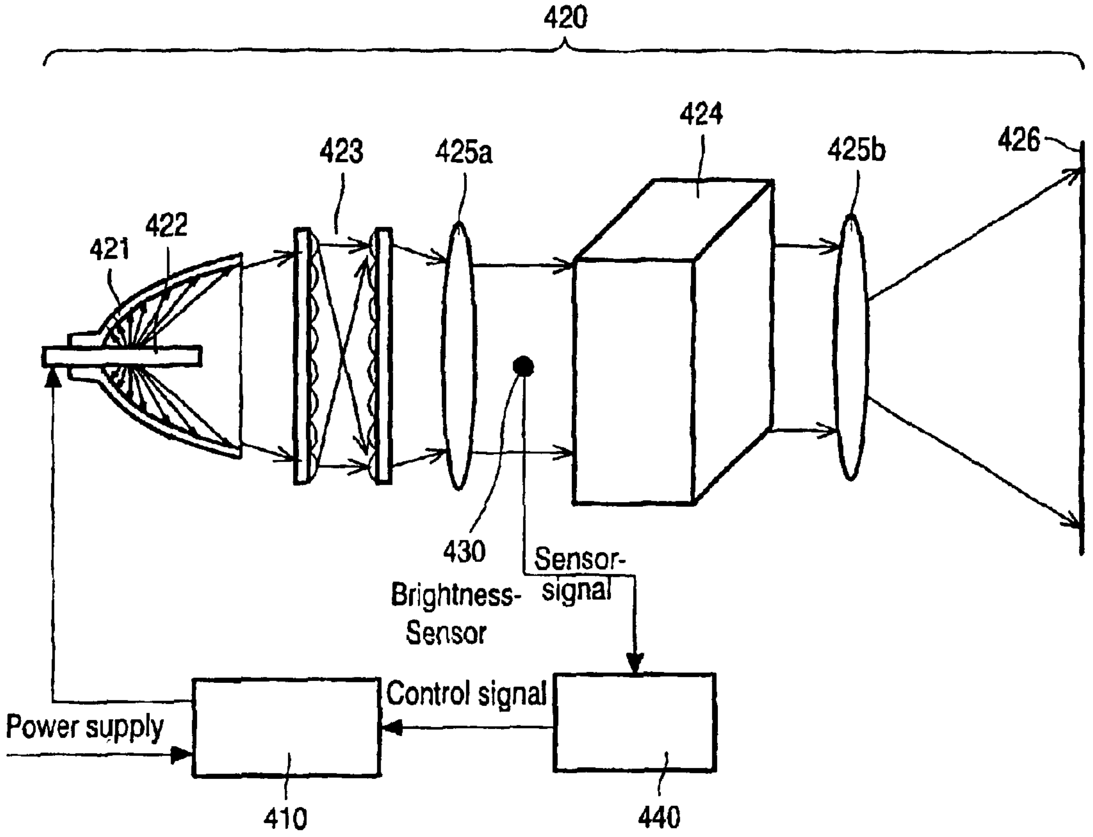
FIG. 3 Prior Art
FIG. 3 shows an image projector of the prior art.

FIG. 2 shows an image projector with HID lamps as a preferred application example for the electronic circuit according to the invention. The image projector substantially comprises the electronic circuit of FIG. 1 and the optical system described above with reference to FIG. 3. Components having the same reference numerals in FIGS. 1–3 are to be regarded as identical or equivalent as far as to their operation is concerned.

In the image projector of FIG. 2, the image generator 424 is positioned between two lens systems 425*a*, 425*b*, and the brightness sensor 130 is positioned adjacent to or inside the image generator 424 such that it catches the quantity of light incident on the image generator. The electronic circuit in the projector accordingly ensures that the image generator 424 is illuminated only with light of constant brightness in the medium term, and that accordingly also the image projected onto a screen 426 by the image generator 424 is not subject to brightness fluctuations which are visible to the human eye.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An electronic circuit for operating a high intensity discharge lamp, the electronic circuit comprising:

a lamp ballast for providing a controlled lamp current for operating the high intensity discharge lamp in response to a control signal;

a brightness sensor for generating and providing a sensor signal representative of a quantity of light given off by the high intensity discharge lamp in a location of the brightness sensor; and a filter for offering the control signal to the lamp ballast through a high-pass filtering of the sensor signal.

2. The electronic circuit of claim 1, wherein a cut-off frequency of the filter lies below 1 Hz.

3. The electronic circuit of claim 1, wherein the filter offers the control signal to the lamp ballast through a band-pass filtering of the sensor signal.

4. The electronic circuit of claim 3, wherein a lower cut-off frequency of the filter lies below 1 Hz and an upper cut-off frequency of the filter lies above 100 Hz.

5. The electronic circuit of claim 1, wherein the lamp ballast controls the lamp current to facilitate a constant quantity of light given off by the high intensity discharge lamp in the location of the brightness sensor.

6. The electronic circuit of claim 5, wherein the lamp ballast generates an electric power to facilitate a constant operation of the high intensity discharge lamp at a rated power level of the high intensity discharge lamp.

7. An image projector, comprising:

an optical system including a high intensity discharge lamp and an image generator connected downstream of the high intensity discharge lamp, the image generator for generating an image; and an electronic circuit including a lamp ballast for providing a controlled lamp current for operating the high intensity discharge lamp in response to a control signal, a brightness sensor for generating a sensor signal representative of a quantity of light given off by the HID lamp and incident on the image generator, and a filter for offering the control signal to the lamp ballast through a high-pass filtering of the sensor signal.

8. The image projector of claim 7, wherein a cut-off frequency of the filter lies below 1 Hz.

9. The image projector of claim 7, wherein the filter offers the control signal to the lamp ballast through a band-pass filtering of the sensor signal.

10. The image projector of claim 9, wherein a lower cut-off frequency of the filter lies below 1 Hz and an upper cut-off frequency of the filter lies above 100 Hz.

11. The image projector of claim 7, wherein the lamp ballast controls the lamp current to facilitate a constant quantity of light given off by the high intensity discharge lamp in the location of the brightness sensor.

12. The image projector of claim 11, wherein the lamp ballast generates an electric power to facilitate a consent operation of the high intensity discharge lamp at a rated power level of the high intensity discharge lamp.

13. An optical system, comprising:

a high intensity discharge lamp for emitting a light in response to a lamp current;

a brightness sensor for generating a sensor signal representative of a quantity of the light emitted by high intensity discharge lamp in a location of the brightness sensor; and an electronic circuit operable to generate the lamp current as a function of a high-pass filtering of the sensor signal.

14. The optical system of claim 13, wherein a cut-off frequency of the high-pass filtering lies below 1 Hz.

15. The optical system of claim 13, wherein the electronic circuit generates the lamp current as a function of a band-pass filtering of the sensor signal.

16. The optical system of claim 15, wherein a lower cut-off frequency of band-pass filtering lies below 1 Hz and an upper cut-off frequency of the band-pass filtering lies above 100 Hz.

17. The optical system of claim 13, wherein the electronic circuit controls the lamp current to facilitate a constant quantity of light given off by the high intensity discharge lamp in the location of the brightness sensor.

18. The optical system of claim 13, wherein the electronic circuit generates an electric power to facilitate a constant operation of the high intensity discharge lamp at a rated power level of the high intensity discharge lamp.

19. The optical system of claim 13, further comprising:

an image generator connected downstream for the high intensity discharge lamp.

20. The optical system of claim 19, wherein the quantity of light given off by the HID lamp in the location of the brightness sensor is incident on the image generator.

* * * * *